(12) United States Patent
Shatters et al.

(10) Patent No.: US 12,353,207 B2
(45) Date of Patent: Jul. 8, 2025

(54) DIGITAL PANNING OF PANORAMIC VIDEO TO FOLLOW MACHINE WORKTOOL MOVEMENT

(71) Applicant: Caterpillar Inc., Peoria, IL (US)

(72) Inventors: Aaron R. Shatters, Montgomery, IL (US); Eric W. Cler, Oswego, IL (US); Michael Anthony Spielman, Osseo, MI (US); Jeffrey K. Berry, Yorkville, IL (US)

(73) Assignee: Caterpillar Inc., Peoria, IL (US)

( * ) Notice: Subject to any disclaimer, the term of this patent is extended or adjusted under 35 U.S.C. 154(b) by 577 days.

(21) Appl. No.: 17/732,270

(22) Filed: Apr. 28, 2022

(65) Prior Publication Data
US 2023/0350412 A1    Nov. 2, 2023

(51) Int. Cl.
*G06T 3/4038* (2024.01)
*B60R 1/24* (2022.01)
*G05D 1/00* (2006.01)
*G06T 3/047* (2024.01)

(52) U.S. Cl.
CPC ............ *G05D 1/0094* (2013.01); *B60R 1/24* (2022.01); *G05D 1/0038* (2013.01); *G06T 3/047* (2024.01); *G06T 3/4038* (2013.01)

(58) Field of Classification Search
None
See application file for complete search history.

(56) References Cited

U.S. PATENT DOCUMENTS

| 9,858,639 | B2 | 1/2018 | Zhang et al. | |
|---|---|---|---|---|
| 10,692,173 | B2 | 6/2020 | Scholl et al. | |
| 10,796,402 | B2 | 10/2020 | Yan et al. | |
| 10,907,326 | B2 | 2/2021 | Olsen et al. | |
| 2017/0120822 | A1* | 5/2017 | Petzold | E02F 9/2054 |
| 2020/0125114 | A1 | 4/2020 | Minagawa et al. | |
| 2021/0002853 | A1* | 1/2021 | Yamashita | E02F 9/2203 |
| 2021/0040708 | A1* | 2/2021 | Kelley | E02F 9/264 |
| 2022/0165021 | A1* | 5/2022 | Kawaguchi | G06T 3/08 |

FOREIGN PATENT DOCUMENTS

WO    2020153292 A1    7/2020

OTHER PUBLICATIONS

Grundhofer, "Recent advances in projection mapping algorithms, hardware and applications" (Year: 2018).*

* cited by examiner

*Primary Examiner* — Eileen M Adams
(74) *Attorney, Agent, or Firm* — Procopio, Cory, Hargreaves & Savitch LLP (57) ABSTRACT

In a mobile equipment with an articulated front portion having a worktool, a fisheye camera with a wide field of view, containing the front portion, is often mounted in a fixed direction on a rear portion of the mobile equipment. Thus, when the front portion moves (e.g., rotates) relative to the rear portion, a view around the front portion may be compromised due to inherent cropping in fisheye-distortion correction. Digital panning of panoramic video is disclosed that rotates a projection surface, in accordance with movement of the front portion, and generates a projected video on the projection surface, utilizing information that may have otherwise been cropped, to expand the visible area around the worktool. The digital panning in the projected video may mimic an operator turning their head to look down the longitudinal axis of the front portion while using the worktool.

18 Claims, 5 Drawing Sheets

DIGITAL PANNING OF PANORAMIC VIDEO TO FOLLOW MACHINE WORKTOOL MOVEMENT

TECHNICAL FIELD

The embodiments described herein are generally directed to operation of a machine via panoramic video, and, more particularly, to digital panning of a panoramic video to follow the movement of a machine worktool.

BACKGROUND

Mobile equipment may comprise one or more cameras that are positioned and mounted to capture video of one or more areas around the mobile equipment. When operating the mobile equipment from within the vehicle cabin, the operator can use the video from these cameras to view hard-to-see areas, such as those to the rear and/or sides of the mobile equipment. When operating the mobile equipment remotely from a remote terminal, these cameras may serve the same purpose but should also include a forward-facing camera so that the remote operator can view the area in front of the mobile equipment.

It is generally desirable to minimize the number of cameras. One reason is the cost of additional cameras, as well as their associated mounting provisions and wiring. Another reason is that an operator has limited ability to efficiently consume and process the information provided by additional camera views.

However, it also desirable to provide a wide field of view (FOV) of the area surrounding the mobile equipment, at positions that provide a good vantage point of the work area while being relatively safe from damage. For this reason, the cameras are often very wide-angle cameras (e.g., fisheye cameras) that each have a 120-degree field of view or greater. The problem with using such wide-angle cameras is that they create panoramic images that are distorted relative to a standard rectilinear projection. This results in the appearance of straight lines in the real world as curved lines in the video.

This fisheye distortion can be disorienting to the operator when the mobile equipment is moving relative to its environment. While the distorted panoramic image frames of the video can be corrected using rectilinear projection (e.g., according to the Scaramuzza fisheye camera model), a very wide field of view, when corrected by rectilinear projection, looks unnatural, especially near the edges of the image frames. This can be disorienting to an operator who is operating the mobile equipment via the video. Thus, the image frames are typically cropped after correction, which reduces the field of view present in the video. In other words, the video does not contain the entire field of view available from the cameras.

As an example, the forward-facing camera on a mobile equipment with an articulated front and rear portion may be mounted to the top-front area of the cabin on the rear portion of the mobile equipment. This keeps the forward-facing camera away from sources of likely damage and provides a vantage point of the worktool that approximates an operator's vantage point from within the cabin. However, when the front end is angled with respect to the rear end, the reduced field of view in the corrected video from this forward-facing camera does not enable good visibility of an area within which a worktool on the front end is able to move.

U.S. Patent Pub. No. 2020/0125114 A1 describes remote operation of a work machine, and U.S. Pat. No. 10,692,173 describes the generation of a rectilinear image from a bowl-shaped image. However, neither of these references addresses the problem of a mobile equipment with a worktool on an articulated portion of the mobile equipment that may be angled with respect to the field of view of a camera.

The present disclosure is directed toward overcoming one or more of the problems discovered by the inventor.

SUMMARY

In an embodiment, a method comprises using at least one hardware processor to, for each of a plurality of input image frames in a video captured by a fisheye camera mounted on a mobile equipment with an articulated front portion: determine a projection surface by, when no movement of the front portion of the mobile equipment is detected since a prior input image frame, using a prior projection surface determined for a prior input image frame, and, when movement of the front portion of the mobile equipment is detected since the prior input image frame, determining a new projection surface according to the movement of the front portion; generate a projected image frame based on a mapping for the determined projection surface; and output the projected image frame to a real-time video stream.

In an embodiment, a mobile equipment comprises: a rear portion; an articulated front portion that is configured to move with respect to the rear portion, wherein the front portion comprises a worktool; at least one fisheye camera, mounted on the rear portion to capture video of a field of view that contains at least a portion of the front portion; and at least one hardware processor that, for each of a plurality of input image frames in the video captured by the at least one fisheye camera, determines a projection surface by, when no movement of the front portion is detected since a prior input image frame, using a prior projection surface determined for a prior input image frame, and, when movement of the front portion is detected since the prior input image frame, determining a new projection surface according to the movement of the front portion, generates a projected image frame based on a mapping for the determined projection surface, and outputs the projected image frame to a real-time video stream.

In an embodiment, a non-transitory computer-readable medium has instructions stored thereon, wherein the instructions, when executed by a processor, cause the processor to, for each of a plurality of input image frames in a video captured by a fisheye camera mounted on a mobile equipment with an articulated front portion: determine a projection surface by, when no movement of the front portion of the mobile equipment is detected since a prior input image frame, using a prior projection surface determined for a prior input image frame, and, when movement of the front portion of the mobile equipment is detected since the prior input image frame, determining a new projection surface according to the movement of the front portion; generate a projected image frame based on a mapping for the determined projection surface; and output the projected image frame to a real-time video stream.

BRIEF DESCRIPTION OF THE DRAWINGS

The details of embodiments of the present disclosure, both as to their structure and operation, may be gleaned in part by study of the accompanying drawings, in which like reference numerals refer to like parts, and in which.

DETAILED DESCRIPTION

The detailed description set forth below, in connection with the accompanying drawings, is intended as a description of various embodiments, and is not intended to represent the only embodiments in which the disclosure may be practiced. The detailed description includes specific details for the purpose of providing a thorough understanding of the embodiments. However, it will be apparent to those skilled in the art that embodiments of the invention can be practiced without these specific details. In some instances, well-known structures and components are shown in simplified form for brevity of description.

Figure 1:
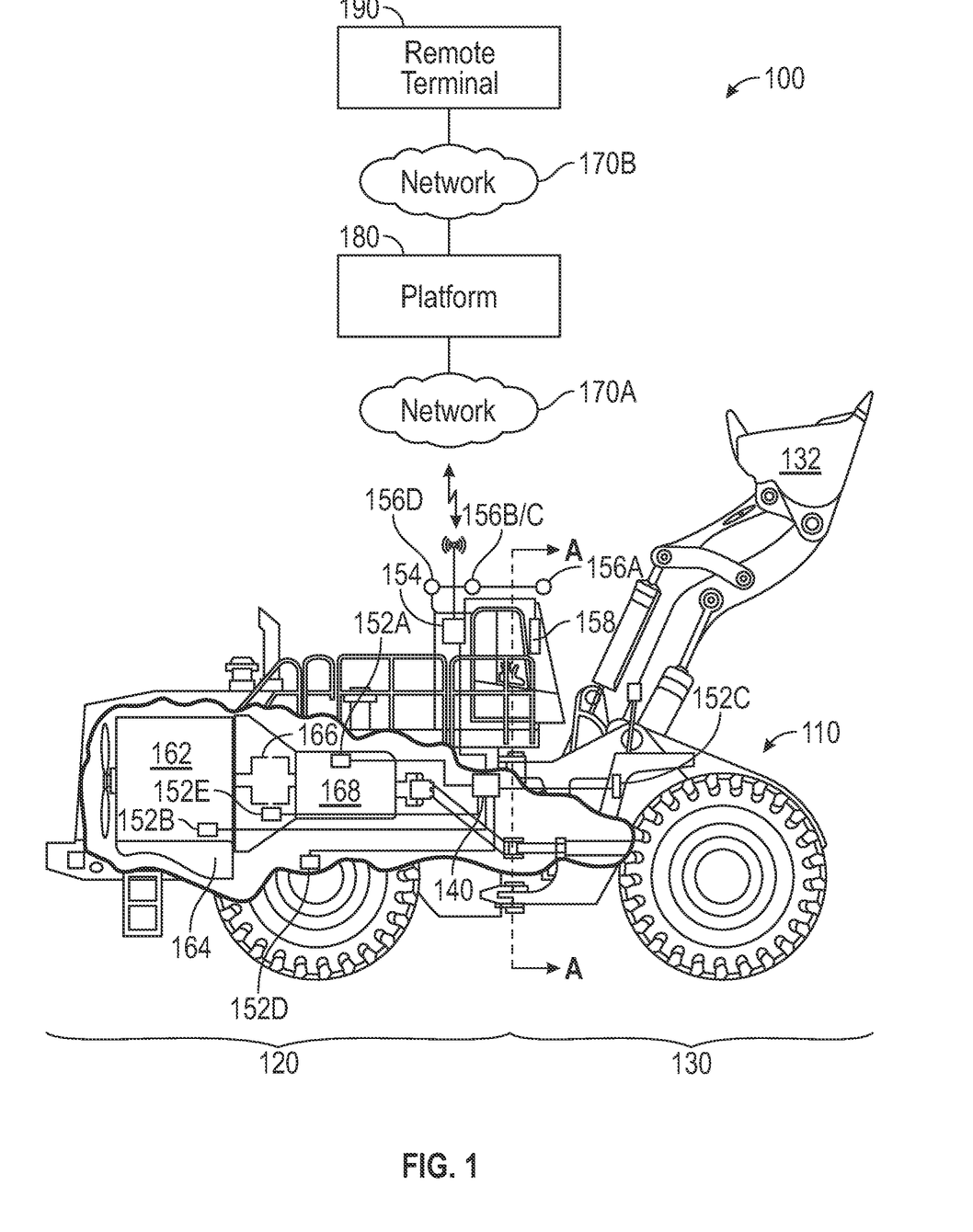
FIG. 1 illustrates a machine environment, according to an embodiment.

FIG. 1 illustrates a machine environment 100, according to an embodiment. Machine environment 100 may include an environment in which one or more mobile equipment 110 perform a task associated within an industry, such as mining, construction, transportation, energy exploration, farming, or the like. For example, machine environment 100 could include one or more mine sites in which a plurality of mobile equipment 110 cooperate to perform a task associated with mining. However, it should be understood that disclosed embodiments are not limited to any particular environment. In addition, while mobile equipment 110 is illustrated as a wheel loader, it should be understood that mobile equipment 110 may be any type of mobile equipment, including a dump truck, asphalt paver, backhoe loader, skid steer, track loader, cold planer, compactor, dozer, electric rope shovel, excavator, forest machine, hydraulic mining shovel, material handler, motor grader, pipe-layer, road reclaimer, telehandler, tractor-scraper, or the like, as well as ordinary road vehicles (e.g., automobiles, semi-trucks, etc.), aircraft, or maritime vessels (e.g., boats, ships, barges, etc.).

In the illustrated example, mobile equipment 110 comprises a rear portion 120 and a front portion 130 that comprises a worktool 132. Front portion 130 may be articulated with respect to rear portion 120, such that front portion 130 is capable of rotating within a range of degrees, relative to rear portion 120, around an axis A. However, it should be understood that disclosed embodiments do not require mobile equipment 110 to comprise an articulated front portion 130. In an alternative example, mobile equipment 110 may comprise non-articulated front and rear portions (e.g., a single, integrated body frame).

Mobile equipment 110 may comprise an electronic control unit (ECU) 140 that is communicatively coupled to one or a plurality of sensors 152A-E (which may be collectively referred to herein as sensor(s) 152) and/or subsystems of mobile equipment 110. ECU 140 may collect data from sensor(s) 152 and/or subsystems and process the collected data. Processing the collected data may comprise determining one or more machine states from the collected data, generating an alert based on the collected data (e.g., if a value of a parameter in the data satisfies a predefined threshold), filtering, analyzing, sorting, correlating, storing, and/or relaying the collected data, and/or the like. ECU 140 may also control the operation of one or more subsystems of mobile equipment 110 based on the collected data and/or operator commands. For example, ECU 140 may be communicatively coupled to a fuel injection system associated with a combustion engine 162 of mobile equipment 110. ECU 140 may receive an operator command (e.g., increase throttle) and provide command signals to the fuel injection system of combustion engine 162, which may responsively increase the flow of fuel from fuel supply 164 to combustion engine 162. Combustion engine 162 may be connected to a torque converter 166 that transmits power from combustion engine 162 to transmission 168. With respect to an articulated mobile equipment 110, ECU 140 may also control rotation of front portion 130 around axis A.

Sensor(s) 152 may include any type of sensor or sensor array capable of measuring values of one or more parameters of one or more subsystems of mobile equipment 110. Examples of such parameters include, without limitation, engine speed, machine speed, location of mobile equipment 110 (e.g., coordinates acquired via a global navigation satellite system (GNSS), such as the Global Positioning System (GPS)), pressure of a fluid (e.g., fuel, oil, coolant, etc.), flow rate of a fluid, temperature of a fluid, contamination level of a fluid, viscosity of a fluid, electric current, electric voltage, fluid consumption rates, loading level, transmission output ratio, slip, grade, traction, mileage, time or mileage until or since scheduled maintenance, angle of articulation between rear portion 120 and front portion 130, and/or the like.

Mobile equipment 110 may comprise a communication module 154, which may be separate or integral to ECU 140. Communication module 154 may comprise hardware and/or software that enables communication between communication module 154 and an access point of a network 170A. For example, communication module 154 may comprise or be connected to a processor, network interface, and wireless transceiver with an antenna that enables wireless communication with a base station of a cellular network. Communication module 154 may send data to a platform 180 and/or receive data from platform 180 via network 170A. For example, ECU 140 may transmit any of the data that is collected or derived from collected data to platform 180 via communication module 154, as well as receive data, such as control commands, from platform 180 via communication module 154.

Mobile equipment 110 may comprise one or more cameras 156A-D (which may be collectively referred to herein as camera(s) 156). Each camera 156 captures video of a field of view of an area around mobile equipment 110. For example, a forward-facing camera 156A captures a front field of view of an area in front of mobile equipment 110 (e.g., including front portion 130 with worktool 132 and its workspace), a right-side-facing camera 156B captures a right field of view of an area to the right of mobile equipment 110, a left-side-facing camera 156C captures a left field of view of an area to the left side of mobile equipment 110, and a rear-facing camera 156D captures a rear field of view of an area in the rear of mobile equipment 110. One or more of cameras 156 may be very wide-angle cameras with a field of view of 120-degrees or greater (e.g., 120-degrees or more). Different cameras 156 may have the same sized or differently sized fields of view. For example, right-side-facing camera 156B and left-side-facing camera 156C may have the same field of view as each other, but have a different field of view than forward-facing camera 156A and/or rear-facing camera 156D. Similarly, forward-facing camera 156A may have a narrower field of view than right-side-facing camera 156B, left-side-facing camera 156C, and rear-facing camera 156D, since fisheye distortion may be more problematic in video from forward-facing camera 156A. In an embodiment, each camera 156 has a maximum field of view that can be narrowed by mechanical, electronic, and/or software means, including in the captured video by software-based correction to eliminate fisheye distortion (e.g., using rectilinear projection). Thus, the field of view that appears in the final video (i.e., intended for viewing by an operator) from each camera 154 may represent the maximum field of view or some angle less than the maximum field of view (e.g., less than 120-degrees).

Each camera 156 may stream or otherwise transmit the captured video, comprising a plurality of image frames, to platform 180 via communication module 154. Camera(s) 156 may transmit the video directly to communication module 154. Alternatively, camera(s) 156 may transmit the video to ECU 140, which may relay the video in real time (e.g., with or without pre-processing) to platform 180 through communication module 154. As used herein, the term "real time" encompasses events that occur simultaneously, as well as events that are separated by ordinary delays resulting from processing latencies, network latencies, and/or the like.

Mobile equipment 110 may comprise a display console 158. Display console 158 may comprise a plasma display, light-emitting diode (LED) display, liquid crystal display (LCD), and/or the like. In an embodiment, display console 158 may comprise an integrated touch sensor to form a touch panel display which may both display data and receive touch inputs at positions on the display from an operator within the cabin of mobile equipment 110. Alternatively or additionally, display console 158 may receive inputs via other input means, such as keyboards, in-cabin cameras, biometric sensing devices, computer mice, trackballs, pen-based pointing devices, and/or the like. Display console 158 may be communicatively coupled to ECU 140, communication module 154, and/or camera(s) 156. Thus, display console 158 may display a graphical user interface which enables an operator in the cabin of mobile equipment 110 to view data collected by ECU 140 (e.g., real-time values of parameters of one or more subsystems of mobile equipment 110), data derived from data collected by ECU 140 (e.g., machine states, alerts, graphs, charts, tables, etc.), and/or data received from platform 180 via communication module 154, view video captured by camera(s) 156, interact with one or more software applications executed on-board mobile equipment 110 (e.g., within ECU 140), perform an audio or audiovisual communication with another person, and/or the like. Thus, an operator in the cabin of mobile equipment 110 may utilize display console 158 to view the surroundings of mobile equipment 110 via camera(s) 156, access operator assistance tools, receive alerts, dispatch information, operational instructions, and/or recommendations, review environmental data (e.g., weather, temperature, soil conditions, etc.), payload information, productivity data, and/or any other type of information, control one or more subsystems of mobile equipment 110 via commands to ECU 140, initiate or receive an audio or audiovisual call, and/or the like.

In an embodiment, video captured by camera(s) 156 is relayed (e.g., with or without pre-processing) to an external system, and, in the illustrated embodiment, through platform 180 to a remote terminal 190. Platform 180 may host and/or execute one or more of the various functions, processes, methods, and/or software modules described herein. Platform 180 may comprise dedicated servers or may instead be implemented in a computing cloud, so as to utilize shared resources of one or more servers. These servers may be collocated and/or geographically distributed. Platform 180 may be communicatively connected to mobile equipment 110 via network 170A and/or a remote terminal 190 via network 170B. Networks 170A and 170B (which may be collectively referred to herein as network 170) may be the same network, separate and distinct networks, or overlapping networks, and may include one or more cellular networks, one or more satellite networks, the Internet, one or more intranets, and/or the like. While only a single instance of mobile equipment 110 and a single instance of remote terminal 190 are illustrated, it should be understood that platform 110 may be communicatively coupled to any number of mobile equipment 110 and remote terminals 190.

Platform 180 may comprise one or more web servers which host one or more websites and/or web services. In embodiments in which a website is provided, the website may comprise a graphical user interface, including, for example, one or more screens (e.g., webpages) generated in HyperText Markup Language (HTML) or other language. Platform 180 transmits or serves one or more screens of the graphical user interface in response to requests from mobile equipment 110 via network 170A and/or remote terminal 190 via network 170B. These screens may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and/or the like.

In embodiments in which a web service is provided, platform 180 may receive requests from external systems, and provide responses in eXtensible Markup Language (XML), JavaScript Object Notation (JSON), and/or any other suitable or desired format. In such embodiments, platform 180 may provide an application programming interface (API) (e.g., implemented in a Representation State Transfer (REST) architecture) which defines the manner in which mobile equipment 110, remote terminal 190, and/or other external system(s) may interact with the web service. Thus, mobile equipment 110, remote terminal 190, and/or other external systems (which may themselves be servers), can define their own user interfaces, and rely on the web service to implement or otherwise provide the backend processes, methods, functionality, storage, and/or the like, described herein. For example, in such an embodiment, a client application, executing on remote terminal 190, may interact with platform 180 to execute one or more or a portion of one or more of the various functions, processes, methods, and/or software modules described herein. In this case, the client application may generate the graphical user interface and access functionality on platform 180 via the API.

Remote terminal 190 may comprise any type of computing device capable of wired and/or wireless communication, including without limitation, desktop computers, laptop computers, tablet computers, smart phones or other mobile phones, servers, game consoles, televisions, set-top boxes, electronic kiosks, point-of-sale terminals, and/or the like. However, it is generally contemplated that remote terminal 190 is a remote operating station by which a remote operator can operate mobile equipment 110 through platform 180. In an alternative embodiment, remote terminal 190 may communicate directly with mobile equipment 110 (i.e., without platform 180 acting as intermediary) to operate mobile equipment 110.

Remote terminal 190 may comprise one or more displays that display, in real time, video captured by camera(s) 156 and transmitted by communication module 154 of mobile equipment 110. Remote terminal 190 may also comprise one or more input devices that enable an operator to provide operating controls to mobile equipment 110. These operating controls may be transmitted as control commands, directly or via platform 180, to communication module 154, which may relay the control commands to ECU 140. ECU 140 may responsively control the appropriate subsystem of mobile equipment 110 in accordance with the control commands. In general, for safety reasons, each remote terminal 190 should control one mobile equipment 110 at a time. However, this is not a requirement of any embodiment.

Figure 2:
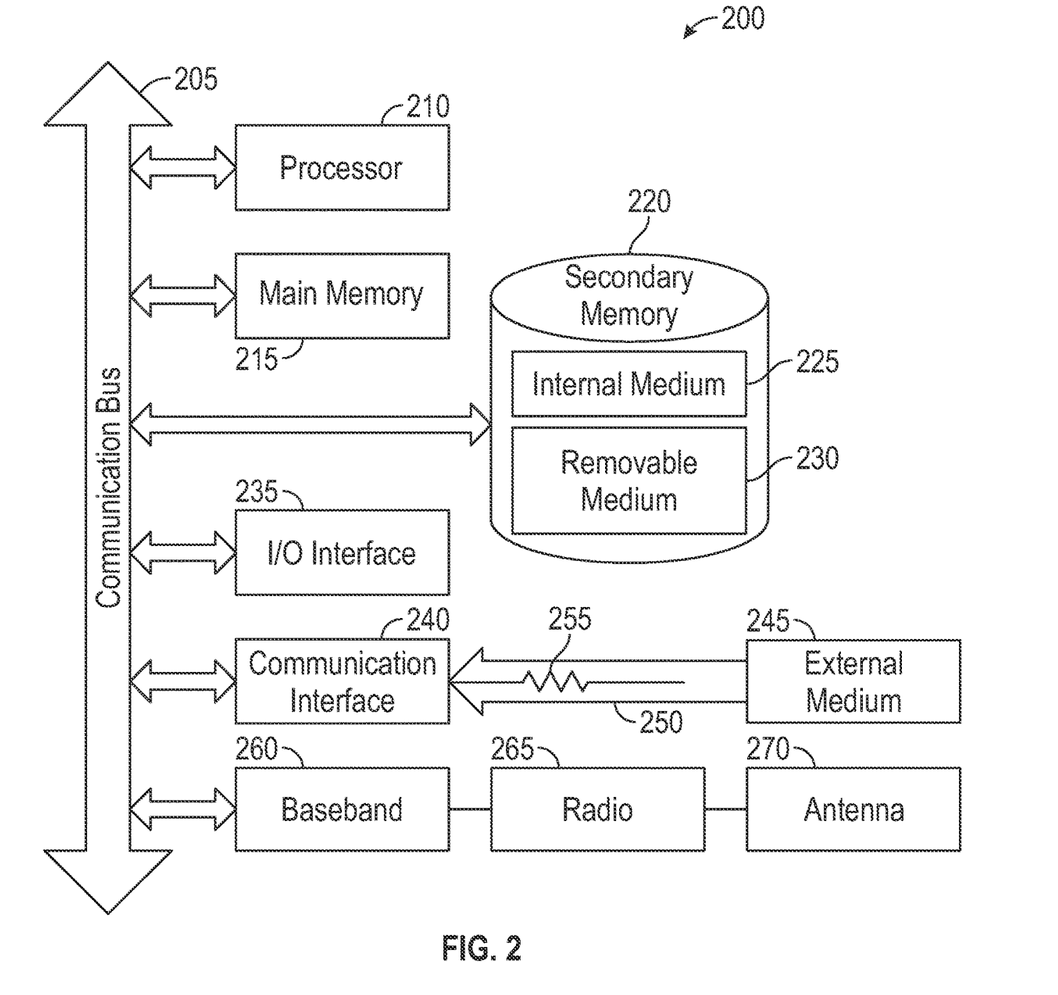
FIG. 2 illustrates an example processing system, by which one or more of the processes described herein, may be executed, according to an embodiment.

FIG. 2 is a block diagram illustrating an example wired or wireless system 200 that may be used in connection with various embodiments described herein. For example, system 200 may be used as or in conjunction with one or more of the functions, processes, or methods described herein (e.g., to store and/or execute the implementing software), and may represent components of mobile equipment 110 (e.g., ECU 140, communication module 154, camera(s) 156, display console 158, etc.), platform 180, remote terminal 190, and/or other processing devices described herein. System 200 can be a server or any conventional personal computer, or any other processor-enabled device that is capable of wired or wireless data communication. Other computer systems and/or architectures may be also used, as will be clear to those skilled in the art.

System 200 preferably includes one or more processors 210. Processor(s) 210 may comprise a central processing unit (CPU). Additional processors may be provided, such as a graphics processing unit (GPU), an auxiliary processor to manage input/output, an auxiliary processor to perform floating-point mathematical operations, a special-purpose microprocessor having an architecture suitable for fast execution of signal-processing algorithms (e.g., digital-signal processor), a processor subordinate to the main processing system (e.g., back-end processor), an additional microprocessor or controller for dual or multiple processor systems, and/or a coprocessor. Such auxiliary processors may be discrete processors or may be integrated with processor 210. Examples of processors which may be used with system 200 include, without limitation, any of the processors (e.g., Pentium™, Core i7™, Xeon™, etc.) available from Intel Corporation of Santa Clara, California, any of the processors available from Advanced Micro Devices, Incorporated (AMD) of Santa Clara, California, any of the processors (e.g., A series, M series, etc.) available from Apple Inc. of Cupertino, any of the processors (e.g., Exynos™) available from Samsung Electronics Co., Ltd., of Seoul, South Korea, any of the processors available from NXP Semiconductors N.V. of Eindhoven, Netherlands, and/or the like.

Processor 210 is preferably connected to a communication bus 205. Communication bus 205 may include a data channel for facilitating information transfer between storage and other peripheral components of system 200. Furthermore, communication bus 205 may provide a set of signals used for communication with processor 210, including a data bus, address bus, and/or control bus (not shown). Communication bus 205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE), and/or the like.

System 200 preferably includes a main memory 215 and may also include a secondary memory 220. Main memory 215 provides storage of instructions and data for programs executing on processor 210, such as any of the software discussed herein. It should be understood that programs stored in the memory and executed by processor 210 may be written and/or compiled according to any suitable language, including without limitation C/C++, Java, JavaScript, Perl, Visual Basic, .NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 220 is a non-transitory computer-readable medium having computer-executable code (e.g., any of the software disclosed herein) and/or other data stored thereon. The computer software or data stored on secondary memory 220 is read into main memory 215 for execution by processor 210. Secondary memory 220 may include, for example, semiconductor-based memory, such as programmable read-only memory (PROM), erasable programmable read-only memory (EPROM), electrically erasable read-only memory (EEPROM), flash memory (block-oriented memory similar to EEPROM), and the like.

Secondary memory 220 may optionally include an internal medium 225 and/or a removable medium 230. Removable medium 230 is read from and/or written to in any well-known manner. Removable storage medium 230 may be, for example, a magnetic tape drive, a compact disc (CD) drive, a digital versatile disc (DVD) drive, other optical drive, a flash memory drive, and the like.

In an embodiment, I/O interface 235 provides an interface between one or more components of system 200 and one or more input and/or output devices. Example input devices include, without limitation, sensors, keyboards, touch screens or other touch-sensitive devices, cameras, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., display console 158, or in a smartphone, tablet computer, or other mobile device).

System 200 may include a communication interface 240. Communication interface 240 allows software and data to be transferred between system 200 and external devices (e.g. printers), networks (e.g., network(s) 170), or other information sources. For example, computer software or executable code may be transferred to system 200 from a network server (e.g., platform 180) via communication interface 240. Examples of communication interface 240 include a built-in network adapter, network interface card (NIC), Personal Computer Memory Card International Association (PCM-CIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 200 with a network (e.g., network(s) 170) or another computing device. Communication interface 240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 240 are generally in the form of electrical communication signals 255. These signals 255 may be provided to communication interface 240 via a communication channel 250. In an embodiment, communication channel 250 may be a wired or wireless network (e.g., network(s) 170), or any variety of other communication links. Communication channel 250 carries signals 255 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs, such as the disclosed software) is stored in main memory 215 and/or secondary memory 220. Computer-executable code can also be received via communication interface 240 and stored in main memory 215 and/or secondary memory 220. Such computer programs, when executed, enable system 200 to perform the various functions of the disclosed embodiments described elsewhere herein.

In this description, the term "computer-readable medium" is used to refer to any non-transitory computer-readable storage media used to provide computer-executable code and/or other data to or within system 200. Examples of such media include main memory 215, secondary memory 220 (including internal memory 225 and/or removable medium 230), external storage medium 245, and any peripheral device communicatively coupled with communication interface 240 (including a network information server or other network device). These non-transitory computer-readable media are means for providing software and/or other data to system 200.

System 200 may also include optional wireless communication components that facilitate wireless communication over a voice network and/or a data network. The wireless communication components (e.g., corresponding to communication module 154) comprise an antenna system 270, a radio system 265, and a baseband system 260. Baseband system 260 is communicatively coupled with processor(s) 210. In system 200, radio frequency (RF) signals are transmitted and received over the air by antenna system 270 under the management of radio system 265.

Figure 3:
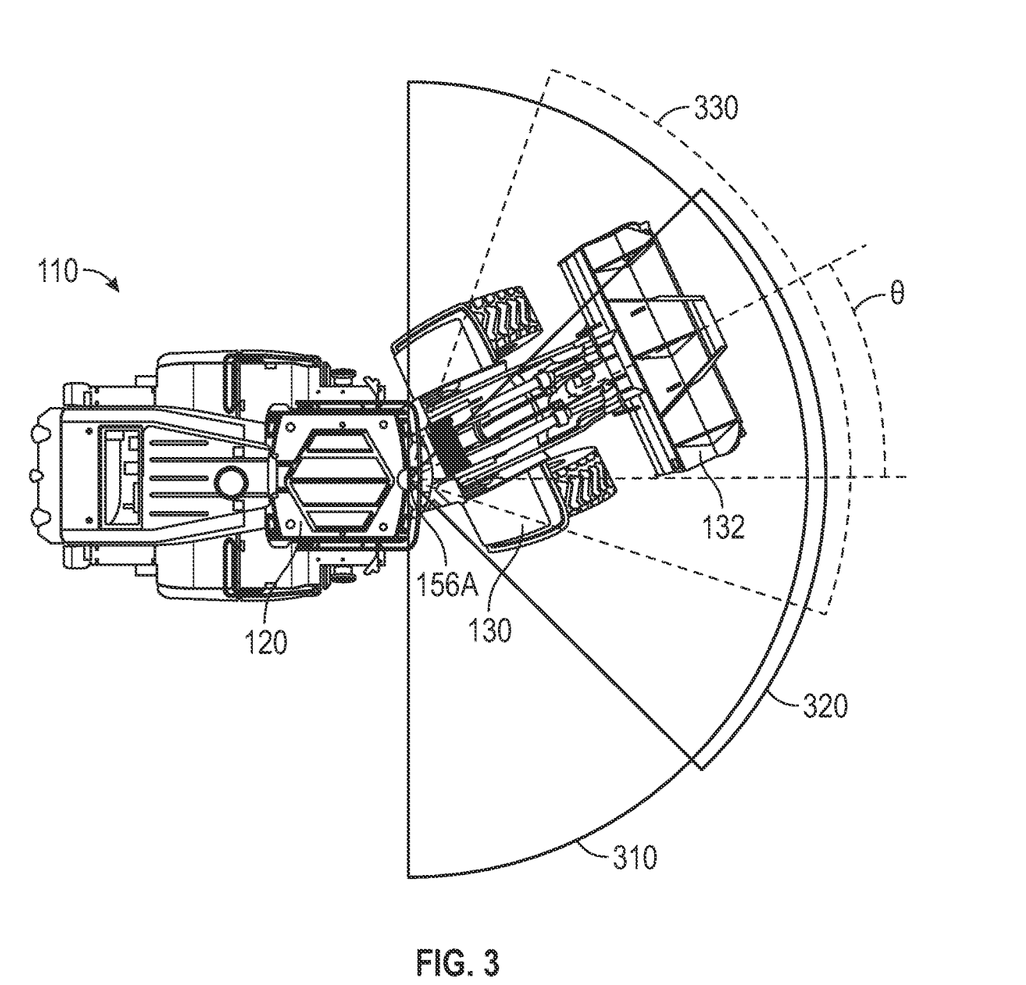
FIG. 3 illustrates digital panning of panoramic video with respect to a mobile equipment, according to an embodiment.

FIG. 3 illustrates digital panning of panoramic video with respect to mobile equipment 110, according to an embodiment. Rear portion 120 and front portion 130 are articulated, such that front portion 130 can rotate around axis A within a range of angles relative to rear portion 120. In the illustrated example, front portion 130, including worktool 132, is at an angle θ with respect rear portion 120.

Forward-facing camera 156A is mounted at the top-front of the cabin on rear portion 120 of mobile equipment 110, to provide a good vantage point of the area in front of mobile equipment 110. While forward-facing camera 156A could be alternatively positioned on front portion 130, there is generally not a safe and adequate location on front portion 130 at which to mount a camera. In addition, mounting of forward-facing camera 156A on front portion 130 would require wiring to be run through the joint(s) between rear portion 120 and front portion 130, which increases manufacturing and maintenance costs, and increases the likelihood of malfunctions.

In addition, forward-facing camera 156A may be stationary. While forward-facing camera 156A could be configured to rotate with front portion 130, the additional mechanics and electronics would the manufacturing and maintenance costs, as well as the likelihood of malfunctions.

As a consequence of forward-facing camera 156A being stationary and mounted on rear portion 120, when front portion 130 is rotated around axis A, such that front portion 130 is at an angle θ with respect rear portion 120, forward-facing camera 156A remains forward facing. In other words, the focal axis of forward-facing camera 156 is not in alignment with the longitudinal axis of front portion 130 and worktool 132 on front portion 130. As a result, worktool 132 will no longer be in the center of the video captured by forward-facing camera 156A. Rather, worktool 132 will rotate with front portion 130, so as to be at an angle θ with respect to the image plane of forward-facing camera 156A and near the edge of the video. Similarly, the area in which worktool 132 moves and operates will also be near the edge of the video. As discussed elsewhere herein, at least a portion of this area will be cropped by distortion correction, thereby reducing the area around worktool 132 that is visible to a remote operator.

In particular, forward-facing camera 156A may have a very wide-angle maximum field of view 310 (e.g., 180 degrees in the illustrated example). Distortion correction, with its inherent cropping, may reduce this maximum field of view 310 to a reduced field of view 320. Notably, this reduced field of view 320 includes a very limited area around worktool 132, especially in the direction towards which front portion 130 is rotated. In some cases, a portion of worktool 132 may even be outside the reduced field of view 320. This is despite the fact that worktool 132 and the area around worktool 132 are well within the maximum field of view 310. Disclosed embodiments digitally pan reduced field of view 320 towards the direction in which front portion 130 is rotated to create a more relevant field of view 330 that, for example, substantially centers worktool 132 within the video. In other words, embodiments take advantage of the fact that maximum field of view 310 contains a more relevant field of view 330 than reduced field of view 320.

Figure 4:
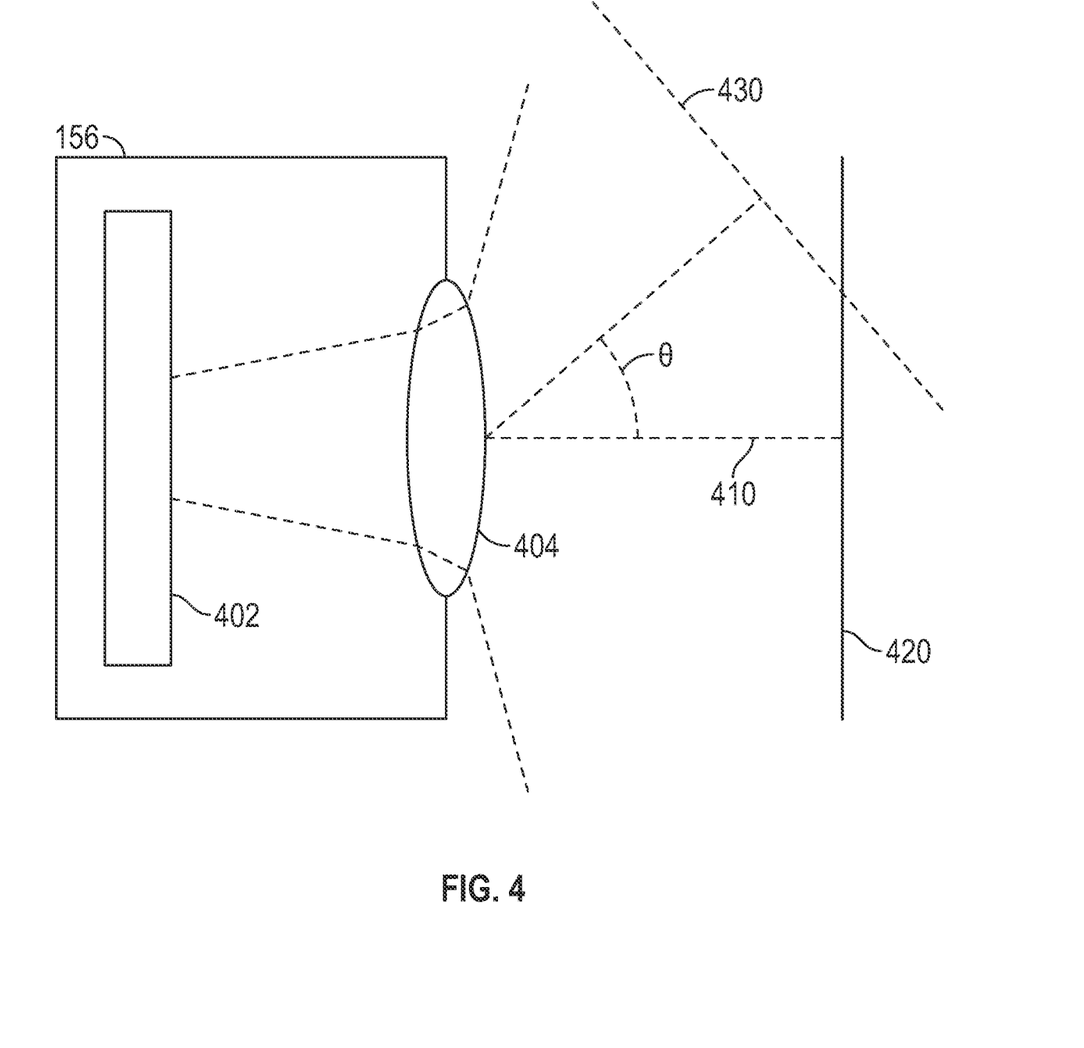
FIG. 4 illustrates digital panning of panoramic video with respect to a camera, according to an embodiment.

FIG. 4 illustrates digital panning of panoramic video with respect to a camera 156, such as forward-facing camera 156A, according to an embodiment. Typically, camera 156 comprises an imaging sensor 402 and a fisheye lens 404 which focuses a very wide-angle field of view onto imaging sensor 402. An initial image plane 420 comprising an initial projection surface for generating distortion-corrected images is perpendicular to the focal axis 410 of camera 156. Image plane 420 corresponds to reduced field of view 320. Disclosed embodiments digitally pan the image frames of the video to re-project the image frames onto an image plane 430 that is rotated by an angle θ with respect to focal axis 410. Image plane 430 corresponds to relevant field of view 330.

Figure 5:
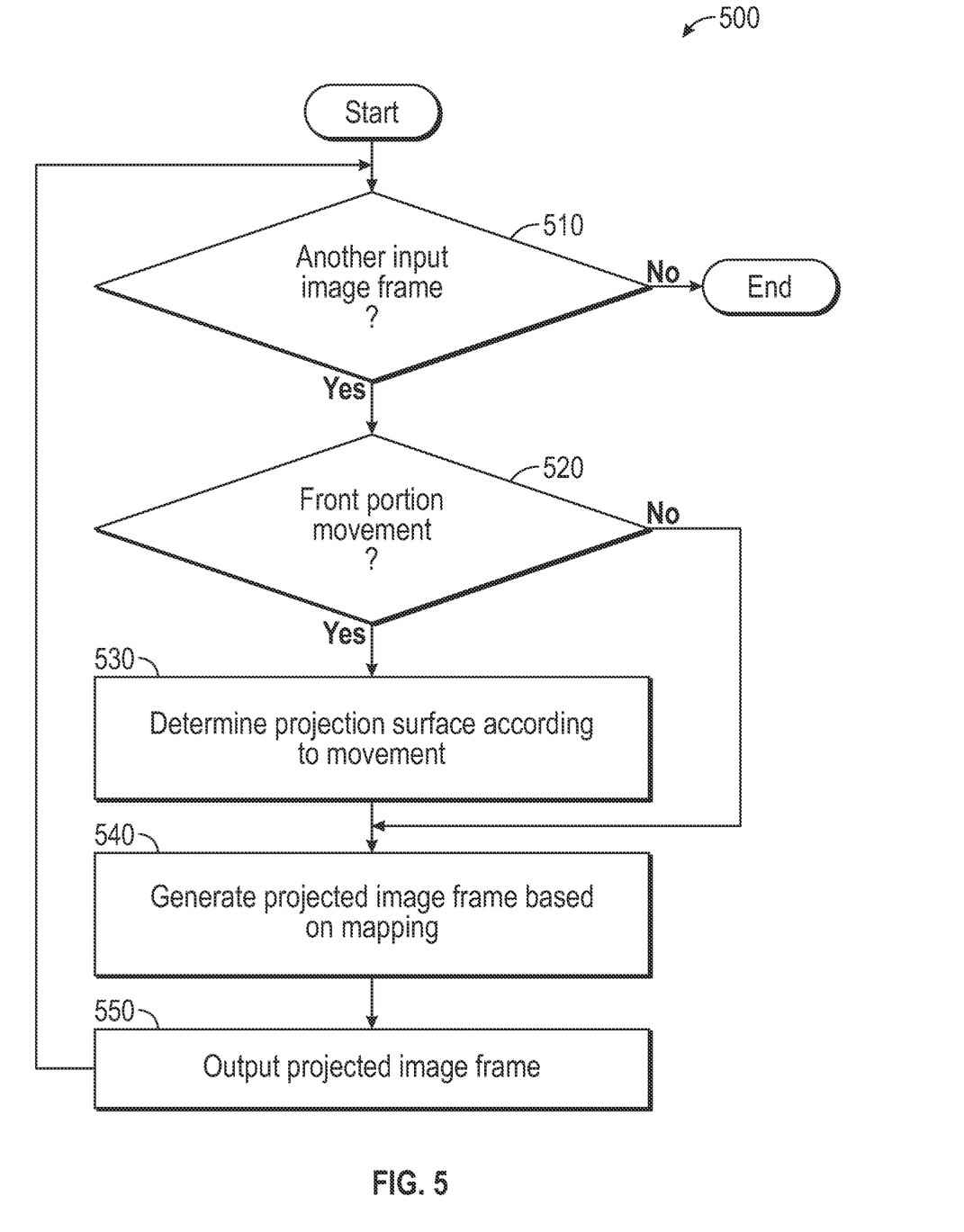
FIG. 5 illustrates a process for digital panning of a panoramic video to follow the movement of a front portion of a mobile equipment, according to an embodiment.

FIG. 5 illustrates a process 500 for digital panning of a panoramic video to follow the movement of front portion 130, according to an embodiment. While process 500 is illustrated with a certain arrangement and ordering of subprocesses, process 500 may be implemented with fewer, more, or different subprocesses and a different arrangement and/or ordering of subprocesses. It should be understood that any subprocess, which does not depend on the completion of another subprocess, may be executed before, after, or in parallel with that other independent subprocess, even if the subprocesses are described or illustrated in a particular order.

It is contemplated that process 500 is executed on mobile equipment 110. In particular, process 500 may be executed by ECU 140 or another processing device on mobile equipment 110. While process 500 could be executed remotely on an external system, such as platform 180 or remote terminal 190, process 500 can reduce the amount of data in the video by converting input image frames into projected image frames with generally fewer pixels. Thus, performance of process 500 on-board mobile equipment 110 can reduce the amount of data that must be transmitted over network 170A. In an alternative embodiment, a portion of process 500 could be executed on mobile equipment 110, while another portion of process 500 is executed on an external system. However, it should be understood that process 500 can be implemented as a relatively computationally inexpensive process, and therefore, should be capable of being entirely executed on mobile equipment 110.

Process 500 may be executed for each of at least a subset of image frames in each video (e.g., all image frames in the video or image frames sampled at a predefined sampling rate from the video) that is captured by one or more camera(s) 156. In particular, process 500 may be executed for each image frame in video that is captured by a camera 156 that has a field of view that includes worktool 132. This camera 156 may be a fisheye camera with a very wide-angle field of view (e.g., 120-degrees or more). In the illustrated embodiment, process 500 is executed for forward-facing camera 156A, since forward-facing camera 156A has a field of view of front portion 130 of mobile equipment 110, which includes worktool 132. It should be understood that in alternative embodiments in which a worktool 132 is located in the rear of mobile equipment 110 or on a side of mobile equipment 110, process 500 could be executed for rear-facing camera 156D or a corresponding one of side-facing cameras 156B/156C, respectively.

Each camera 156 may be calibrated prior to operation, at regular intervals, and/or the like. Calibration can be used to precisely map points in the field of view of camera 156 to points in image plane 420 of camera 156. This can be done using the Omnidirectional Camera Calibration Toolbox for Matlab (OCamCalib) with a target (e.g., checkerboard). However, it should be understood that this is simply one example, and that other methods of calibration may be used. Disclosed embodiments do not depend on any particular calibration method and do not require calibration in the first place. In an embodiment which does utilize calibration, calibration parameters of camera 156 may be stored in memory (e.g., in ECU 140) for subsequent image processing (e.g., distortion correction).

In subprocess 510, it is determined whether or not another input image frame remains to be processed. Process 500 may be executed in real time for as long as video is being captured by camera 156, to process all or a sampled subset of image frames in the video as they are captured. If another input image frame remains to be processed (i.e., "Yes" in subprocess 510, indicating that video capture is ongoing), process 500 executes an iteration of subprocesses 520-550. Otherwise, if no input image frame remains to be processed (i.e., "No" in subprocess 510, indicating that video capture has ceased, for instance, due to shutdown of mobile equipment 110), process 500 may end for camera 156.

In subprocess 520, process 500 determines whether or not articulated front portion 130 has moved since the last iteration of subprocesses 520-550. Movement of front portion 130 may comprise or consist of the rotation of front portion 130 around axis A. In this case, the movement of front portion 130 may be represented by an amount and direction of the movement (e.g., angular velocity of front portion 130). Notably, the longitudinal axis of front portion 130 will always be aligned with a radial axis perpendicular to axis A, such that the position and orientation of front portion 130 can be calculated based on the movement (e.g., as an angle $\theta$ with respect to the longitudinal axis of rear portion 120 and/or focal axis 410 of camera 156). If there has been movement since the last iteration (i.e., "Yes" in subprocess 520), process 500 proceeds to subprocess 530 to determine a new projection surface.

Otherwise, if there has not been movement since the last iteration (i.e., "No" in subprocess 520), process 500 skips subprocess 530 and proceeds to subprocess 540. In this case, subprocess 540 may utilize a prior projection surface that was determined in an immediately preceding iteration of subprocess 530 and stored in memory (e.g., within ECU 140). While the projection surface could be redetermined in each iteration, such computation should be unnecessary. In particular, if there has been no movement of front portion 130 since the preceding iteration, the projection surface should remain the same as in the preceding iteration, and therefore, can be reused.

In the illustrated embodiment, worktool 132 is attached to front portion 130. Thus, rotation of front portion 130 around axis A also effects an identical rotation of worktool 132 around axis A. In other words, the movement of front portion 130 is also movement of worktool 132. However, it should be understood that worktool 132 may also move in other manners, depending on the type of worktool 132. For example, the illustrated worktool 132 is a bucket assembly. In this bucket assembly, the bucket arm and the bucket may both be capable of moving (e.g., by pivoting in vertical directions), independent of the rotation angle $\theta$ of worktool 132.

Worktool 132 may be controlled by a remote operator. In particular, a remote operator may instruct front portion 130 to rotate via one or more inputs at remote terminal 190. Remote terminal 190 may format these instructions into control commands that are sent to ECU 140 of mobile equipment 110 (e.g., via platform 180, over network(s) 170, etc.). ECU 140 may parse the control commands and convert them into control signals, to one or more subsystems, to rotate front portion 130 and/or otherwise move worktool 132, according to the remote operator's instructions. ECU 140 may determine the angle, velocity, orientation, and/or other parameters of the rotation, front portion 130, and/or worktool 132 from the commands and/or via feedback from sensor(s) 152 of the controlled subsystem(s). Thus, the movement of front portion 130 may be detected in subprocess 520 by ECU 140.

In subprocess 530, the projection surface is calculated or otherwise determined according to the movement detected in subprocess 520. Although the projection surface is primarily illustrated herein as two-dimensional, the projection surface could be three-dimensional. Regardless of whether the projection surface is two-dimensional or three-dimensional, the projection surface is oriented and rotatable within a three-dimensional space.

In the illustrated embodiment in which front portion 130 rotates around axis A, the projection surface is rotated around a fixed axis (which may or may not correspond to axis A, as described elsewhere herein) to match the movement of front portion 130. For example, the projection surface may be rotated the same amount of degrees around the fixed axis as front portion 130 has rotated around axis A since the last iteration of subprocess 530. Methods for calculating a projection surface within three-dimensional space are well-known in the art, and therefore, will not be described in detail herein. It should be understood that any known method for calculating a projection surface may be used in subprocess 530.

In an embodiment, if front portion 130 has a non-zero angular velocity, the projection surface may be rotated more than the amount of degrees that front portion 130 has rotated around axis A since the last iteration of subprocess 530, in proportion to the angular velocity of front portion 130, to account for latencies that may occur before the video is displayed to a remote operator. In other words, subprocess 530 could predict the angle θ of front portion 130 at the time that the remote operator will be viewing the image frame, based on the angular velocity of front portion 130 and expected latencies (e.g., in communications via network 170), and calculate the projection surface to match that predicted angle θ.

Referring again to FIG. 4, when the longitudinal axis of front portion 130 is aligned with focal axis 410, the projection surface will be parallel to image plane 420 of camera 156. Assuming the projection surface is at the same focal distance as image plane 420, the projection surface will be within image plane 420. As front portion 130 rotates around axis A by an angle θ, the projection surface is also rotated around an axis in subprocess 530 by the same or similar angle θ to lie within image plane 430. The axis around which the projection surface is rotated may be defined as any arbitrary axis parallel to axis A, but should generally extend perpendicularly through focal axis 410. For example, the axis may extend through the center of camera 156, the center of image sensor 402, the center of lens 404, or may be axis A itself. Regardless of the location of the axis, it should be understood that the radial distance from the axis to image plane 420 may be identical to the radial distance from the axis to image plane 430. Thus, the rotation of the projection surface mimics the rotation of an in-cabin operator's head to align the operator's view with the longitudinal axis of front portion 130, and by extension, worktool 132.

In subprocess 540, a projected image frame is generated for the current projection surface (e.g., as calculated in the most recent iteration of subprocess 530), based on a mapping for the projection surface between coordinates of the projected image frame and positions in the input image frame. In practice, the aspect ratio and resolution of the final, projected image frame, representing the image on the projection surface, is known in advance. The aspect ratio and resolution may be defined in accordance with the particular design goals, and may depend on the capabilities of camera(s) 156, the computational resources available at mobile equipment 110 (e.g., within ECU 140), the bandwidth available from communication module 154 and/or in network 170A, the computational resources available at platform 180, the computational resources and/or display capabilities at remote terminal 190, and/or the like. In general, the closer the projection surface is to camera 156 (i.e., the shorter the radial distance), the larger the field of view. Conversely, the farther the projection surface is from camera 156 (i.e., the longer the radial distance), the smaller the field of view.

Typical aspect ratios include 32:9, 21:9, 16:9, 16:10, 4:3, and the like. Typical resolutions for a 32:9 aspect ratio include 3840×1080 pixels, 5120×1440 pixels, and the like. Typical resolutions for a 21:9 aspect ratio include 2560× 1080 pixels, 3440×1440pixels, 5120×160 pixels, and the like. Typical resolutions for a 16:9 aspect ratio include 1280×720 pixels, 1366×768 pixels, 1600×900 pixels, 1920× 1080 pixels (High Definition), 2560×1440 pixels, 3840× 2160 pixels (Ultra High Definition), 4096×2160 pixels (4k), 5120×2880 pixels (5k), 7680×4320 pixels (8k), and the like. Typical resolutions for a 4:3 aspect ratio include 1280×1024 pixels, 1400×1050 pixels, 1440×1080 pixels, 1600×1200 pixels, 1920×1440 pixels, 2048×1536 pixels, and the like.

The projected image frame represents the projection surface within a coordinate system defined by the aspect ratio and resolution of the projected image frame. A pixel value is generated for each coordinate in the coordinate system (e.g., each coordinate comprising an X and Y coordinate in a two-dimensional coordinate system) to produce the projected image frame. In particular, the pixel value for a given coordinate may be determined by firstly mapping the coordinate in the projected image frame to a position in the input image frame. The mapping may be an algorithm that receives a coordinate in the projected image frame as input and, based on a definition of the projection surface and potentially any calibration parameters stored for camera 156, returns a position in the input image frame corresponding to the received coordinate. The definition of the projection surface may comprise an indication of the current or predicted angle θ of front portion 130 and/or any other data indicative of the projection surface. Alternatively, the mapping may be a plurality of lookup tables that are calculated in advance and stored in memory (e.g., within ECU 140). In this case, a lookup table may be provided for each of a plurality of angles θ. The plurality of angles θ represent a finite set of possible projection surfaces that are each rotated at a different one of the plurality of angles θ with respect to focal axis 410 (e.g., for a 180-degree camera, 181 lookup tables each representing one degree from −90° to +90°, including) 0°. The position within the input image frame may be retrieved from the relevant lookup table for the projection surface, determined in subprocess 530, using the coordinate in the projected image frame as an index. If front portion 130 is articulated at an angle θ that is not one of the plurality of angles θ for which a lookup table is stored, subprocess 530 may select the closest angle θ within the plurality of angles θ as representing the projection surface or may interpolate between the lookup tables for the two closest ones of the plurality of angles θ.

In general, given a coordinate $(x_p, y_p)$ in the projected image frame, the mapping produces a position $(x_i, y_i)$ in the input image frame:

$$x_i = \mathrm{map}_x(x_p, y_p)$$

$$y_i = \mathrm{map}_y(x_p, y_p)$$

wherein $\mathrm{map}_x$ is the mapping for the x-axis in the coordinate system, and $\mathrm{map}_y$ is the mapping for the y-axis in the coordinate system. The mapping may utilize or be derived from OCamCalib.

In addition to mapping the input image frame to the projection surface, the mapping may incorporate distortion correction for fisheye distortion and/or tangential distortion in the input image frame. For example, the Scaramuzza fisheye model may be applied to position $(x_i, y_i)$ for fisheye-distortion correction. Tangential distortion occurs when the image plane is not perpendicular to the focal axis, for example, due to misalignment between sensor 402 and lens 404 in camera 156. In this case, an affine transform, which may be determined as a calibration parameter during calibration of camera 156, may be applied to position $(x_i, y_i)$ to correct for the tangential distortion. It should be understood that the mapping may be implemented as a plurality of mappings that determine position $(x_i, y_i)$ for the coordinate $(x_p, y_p)$ on the projection surface and then apply correction(s) to position $(x_i, y_i)$, or as a single integrated mapping that determines position $(x_i, y_i)$, including any correction(s), for the coordinate $(x_p, y_p)$ on the projection surface.

In some cases, the position $(x_i, y_i)$ may correspond to a single coordinate in the coordinate system of the input image frame. In this case, the pixel value at coordinate $(x_i, y_i)$ in the input image frame may simply be copied to coordinate $((x_p, y_p))$ in the projected image frame. However, in most cases, the position $(x_i, y_i)$ will not correspond to a single coordinate in the input image frame. In this case, the pixel value of coordinate $(x_p, y_p)$ in the projected image frame can be interpolated from two or more coordinates surrounding position $(x_i, y_i)$ in the input image frame. For example, assume that the nearest coordinates to position $(x_i, y_i)$ in the input image frame are coordinates $(x_1, y_1)$, $(x_2, y_2)$, $(x_3, y_3)$, and $(x_4, y_4)$, which form a box around position $(x_i, y_i)$. In this case, the pixel value for coordinate $(x_p, y_p)$ in the projected image frame may be interpolated from the pixel values of coordinates $(x_1, y_1)$, $(x_2, y_2)$, $(x_3, y_3)$, and $(x_4, y_4)$. As one example, the interpolation may be a weighted average of the pixel values of coordinates $(x_1, y_1)$, $(x_2, y_2)$, $(x_3, y_3)$, and $(x_4, y_4)$ in the input image frame, with the pixel values of coordinates that are closer in distance (e.g., Euclidean distance) to position $(x_i, y_i)$ weighted higher than the pixel values of coordinates that are farther in distance from position $(x_i, y_i)$). However, it should be understood that this is simply one example, and that any suitable interpolation scheme may be used in subprocess 540.

In subprocess 550, the projected image frame, with the pixel values generated in subprocess 540, is output. Then process 500 returns to subprocess 510 to determine whether or not another input image frame is to be processed. It should be understood that the projected image frame, output in subprocess 550, may be the image frame that is transmitted (e.g., via communication module 154) and displayed at remote terminal 190 to a remote operator, within the context of a real-time video stream during operation of mobile equipment 110. Thus, the remote operator may control front portion 130, including worktool 132, to rotate around axis A, and the video may be panned in real time to rotate with front portion 130 (i.e., by rotating the projection surface in subprocess 530 based on the movement of front portion 130).

INDUSTRIAL APPLICABILITY

Some applications, such as the remote operation of a mobile equipment 110, can benefit from panoramic video with a very wide field of view and low distortion. However, in the case of mobile equipment 110 with a worktool 132 on an articulated front portion 130, a camera 156A with a field of view of worktool 132 is typically fixed on a rear portion 120, due to concerns of cost, durability, complexity, and the like. This means that camera 156A cannot mechanically rotate with front portion 130, including worktool 132. Thus, a remote operator, operating mobile equipment 110 from a remote terminal 190, is unable to pan camera 156A so as to look down the longitudinal axis of worktool 132. This can make it difficult for the remote operator to operate worktool 132.

Disclosed embodiments provide digital panning of panoramic video by re-projecting input image frames onto a projection surface that is aligned with front portion 130 (e.g., perpendicular to and centered over the longitudinal axis of front portion 130). This re-projection may also incorporate distortion correction. The digital panning effectively rotates the field of view to enable the remote operator to view worktool 132, as well as the workspace in front of worktool 132, down the longitudinal axis of front portion 130, as if the remote operator was seated within the cabin of mobile equipment 110 and turned their head towards worktool 132.

Notably, when fisheye-distortion correction is applied to panoramic video from a fixed camera 156A, information on the edges of the captured image frames is conventionally lost, due to the inherent cropping involved in such correction. However, the digital panning described herein can leverage that conventionally lost information, to generate the projected image frames, as front portion 130, including worktool 132, is rotated towards the edges of the field of view of camera 156A.

It will be understood that the benefits and advantages described above may relate to one embodiment or may relate to several embodiments. Aspects described in connection with one embodiment are intended to be able to be used with the other embodiments. Any explanation in connection with one embodiment applies to similar features of the other embodiments, and elements of multiple embodiments can be combined to form other embodiments. The embodiments are not limited to those that solve any or all of the stated problems or those that have any or all of the stated benefits and advantages.

The preceding detailed description is merely exemplary in nature and is not intended to limit the invention or the application and uses of the invention. The described embodiments are not limited to usage in conjunction with a particular type of machine. Hence, although the present embodiments are, for convenience of explanation, depicted and described as being implemented in mobile equipment for industrial applications, it will be appreciated that it can be implemented in various other types of mobile equipment and machines, and in various other systems and environments, including other image-processing applications. Furthermore, there is no intention to be bound by any theory presented in any preceding section. It is also understood that the illustrations are not necessarily drawn to scale and may include exaggerated dimensions and graphical representation to better illustrate the referenced items shown, and are not considered limiting unless expressly stated as such. In other words, the features disclosed in various embodiments may be implemented using different relative dimensions within and between components than those illustrated in the drawings.

What is claimed is:

1. A method comprising using at least one hardware processor to, for each frame of a plurality of input image frames in a video captured by a fisheye camera mounted on a mobile equipment with an articulated front portion:
   (1) determine a projection surface by:
      when no movement of the front portion of the mobile equipment is detected since a prior input image frame, using a prior projection surface determined for the prior input image frame, and,
      when movement of the front portion of the mobile equipment is detected since the prior projection surface was determined for the prior input image frame, determining a new projection surface according to the movement of the front portion;

(2) generate a projected image frame based on a mapping for the determined projection surface, including for each of a plurality of coordinates in the projected image frame:
mapping the coordinate to a position in the input image frame based on the determined projection surface, and
generating a pixel value for the coordinate based on the position in the input image frame; and (3) output the projected image frame to a real-time video stream.

2. The method of claim 1, wherein determining a new projection surface according to the movement of the front portion comprises rotating the prior projection surface in a direction of rotation of the front portion.

3. The method of claim 1, wherein determining a new projection surface according to the movement of the front portion comprises rotating the prior projection surface according to an angular velocity of the front portion.

4. The method of claim 1, wherein mapping the coordinate to a position in the input image frame is further based on a fisheye-distortion correction model.

5. The method of claim 1, wherein mapping the coordinate to a position in the input image frame is further based on one or more calibration parameters for the fisheye camera.

6. The method of claim 1, wherein generating a pixel value for the coordinate based on the position in the input image frame comprises, when the position in the input image frame does not correspond to a single coordinate in the input image frame, interpolating the pixel value from a plurality of coordinates in the input image frame that surround the position in the input image frame.

7. The method of claim 1, wherein the at least one hardware processor is comprised in the mobile equipment.

8. The method of claim 7, further comprising using the at least one hardware processor to transmit the real-time video stream over a wireless network to at least one external system.

9. The method of claim 8, further comprising using the at least one hardware processor to:
receive control commands over the wireless network from the at least one external system; and
control one or more subsystems of the mobile equipment according to the received control commands.

10. The method of claim 1, wherein the at least one hardware processor is comprised in an electronic control unit of the mobile equipment.

11. The method of claim 10, further comprising using the at least one hardware processor to detect the movement of the front portion based on one or more sensor signals from at least one sensor in the mobile equipment.

12. A mobile equipment comprising:
a rear portion;
an articulated front portion that is configured to move with respect to the rear portion, wherein the front portion comprises a worktool;
at least one fisheye camera, mounted on the rear portion to capture video of a field of view that contains at least a portion of the front portion; and
at least one hardware processor that, for each frame of a plurality of input image frames in the video captured by the at least one fisheye camera,
determines a projection surface by:
when no movement of the front portion is detected since a prior input image frame, using a prior projection surface determined for the prior input image frame, and,
when movement of the front portion is detected since the projection surface was determined for the prior input image frame, determining a new projection surface according to the movement of the front portion,
generates a projected image frame based on a mapping for the determined projection surface, including for each of a plurality of coordinates in the projected image frame:
mapping the coordinate to a position in the input image frame based on the determined projection surface, and
generating a pixel value for the coordinate based on the position in the input image frame, and
outputs the projected image frame to a real-time video stream.

13. The mobile equipment of claim 12, wherein determining a new projection surface according to the movement of the front portion comprises rotating the prior projection surface in a direction of rotation of the front portion.

14. The mobile equipment of claim 12, wherein determining a new projection surface according to the movement of the front portion comprises rotating the prior projection surface according to an angular velocity of the front portion.

15. The mobile equipment of claim 12, wherein mapping the coordinate to a position in the input image frame is further based on one or both of a fisheye-distortion correction model or one or more calibration parameters for the fisheye camera.

16. The mobile equipment of claim 12, wherein the at least one hardware processor transmits the real-time video stream over a wireless network to at least one external system.

17. The mobile equipment of claim 16, wherein the at least one hardware processor:
receives control commands over the wireless network from the at least one external system; and
controls one or more subsystems of the mobile equipment according to the received control commands.

18. A non-transitory computer-readable medium having instructions stored thereon, wherein the instructions, when executed by a processor, cause the processor to, for each frame of a plurality of input image frames in a video captured by a fisheye camera mounted on a mobile equipment with an articulated front portion:

(1) determine a projection surface by:
when no movement of the front portion of the mobile equipment is detected since a prior input image frame, using a prior projection surface determined for the prior input image frame, and,
when movement of the front portion of the mobile equipment is detected since the projection surface was determined for the prior input image frame, determining a new projection surface according to the movement of the front portion;

(2) generate a projected image frame based on a mapping for the determined projection surface, including for each of a plurality of coordinates in the projected image frame:
mapping the coordinate to a position in the input image frame based on the determined projection surface, and generating a pixel value for the coordinate based on the position in the input image frame; and
(3) output the projected image frame to a real-time video stream.

\* \* \* \* \*